United States Patent [19]

Meek et al.

[11] 4,034,273
[45] July 5, 1977

[54] TURBO-ELECTRIC TURRET DRIVE SYSTEM FOR MOBILE VEHICLES

[75] Inventors: James M. Meek, Silver Spring; Benjamin E. Dunmore, Lanham, both of Md.

[73] Assignee: The United States of America as represented by the Secretary of the Army, Washington, D.C.

[22] Filed: Feb. 4, 1975

[21] Appl. No.: 546,973

[52] U.S. Cl. .............................. 318/149; 318/682; 290/14; 89/41 M; 89/41 MC
[51] Int. Cl.² .................. B60K 41/02; B60K 41/04
[58] Field of Search .......... 318/682, 149, 150, 161, 318/15; 290/14; 89/41 M, 41 MC

[56] References Cited

UNITED STATES PATENTS

| | | | |
|---|---|---|---|
| 1,635,598 | 7/1927 | Whitehorn | 290/14 |
| 2,289,241 | 7/1942 | Bullock | 318/682 |
| 2,356,152 | 8/1944 | Edwards et al. | 89/41 M |
| 2,509,446 | 5/1950 | Oplinger et al. | 318/682 |
| 2,567,636 | 9/1951 | Cuny | 318/150 X |
| 2,741,731 | 4/1956 | Pestarini | 318/161 X |
| 2,796,570 | 6/1957 | Pestarini | 318/149 X |
| 3,525,874 | 8/1970 | Toy | 290/14 |
| 3,689,812 | 9/1972 | Eisele | 318/151 |
| 3,858,674 | 1/1975 | Tabor | 318/161 X |

*Primary Examiner*—B. Dobeck
*Attorney, Agent, or Firm*—Nathan Edelberg; Robert P. Gibson; Saul Elbaum

[57] ABSTRACT

A turret drive system for mobile and armored vehicles includes a turbo-generator for supplying power to an electric motor. The driveshaft of the motor is connected to the driveshaft of a rotary amplifier, with a flywheel mounted to the interconnecting driveshaft. The flywheel stores kinetic energy which is delivered via the amplifier to a D.C. motor which in turn drives the turret through gearing members. A portion of the large energy reservoir in the flywheel may be instantly transferred to the turret by suitable control signals, resulting in high instantaneous power being developed to drive the turret and consequent improvement of performance of weapons mounted in the turret. The system also provides regulated electric power for ancillary vehicle equipment.

13 Claims, 2 Drawing Figures

TURBO-ELECTRIC TURRET DRIVE SYSTEM FOR MOBILE VEHICLES

RIGHTS OF THE GOVERNMENT

The invention described herein may be manufactured, used, and licensed by or for the United States Government for governmental purposes without the payment to us of any royalty thereon.

FIELD OF THE INVENTION

The present invention relates to engine-generator, power-drive systems, and more particularly to such a system adapted for use in a turret equipped mobile vehicle for precise control of turret rotation.

BRIEF DESCRIPTION OF THE PRIOR ART

In the prior art, a variety of turret designs have been utilized. In some applications, a large-caliber gun is mounted in the turret, such as the self-propelled Howitzer. In this application, the turret is slowly trained by power or by manual cranking to aim the gun on the target and the gun is fired after stopping both vehicle and turret motion. In another application, anti-tank gun-turrets on main battle tanks are designed to fire at relatively slow moving targets requiring a relatively slow motion of the gun turret. In recent years, gyroscopic stabilization of such slow-moving turrets has provided the added capability of gun-firing while the battle tank is moving over the terrain. In yet another application, naval gun-control and missile-launching systems, for defense against aerial targets require relatively fast, rapid-response turrets which provide accurate aiming of the weapons.

In the latter application, considerable space is utilized within the ship's hull to accommodate power and control equipment.

BRIEF DESCRIPTION OF THE PRESENT INVENTION

In the present invention, important improvements have been made in the areas of performance, mobility, and compactness of turret-drive systems for application to missile-launch and gun-fire-control systems in land-based vehicles which may have a capability of firing on the move. For engaging high-speed aerial targets, the weapon turret may be equipped with optical or radar trackers. The turret must therefore be capable of maintaining continuous alignment with a moving reference axis corresponding to a horizontal projection of the line-of-sight (boresight) between the weapon turret and the target. To maintain this alignment, the turret must be driven at angular rotation rates and accelerations which increase with increasing target speed and reduced target-trajectory-to-turret offset distance. For gun-fire-control applications, the turret velocities and accelerations are further increased by amounts equal to the first and second time derivatives of the required lead angle in advance of the target. Weapon effectiveness in terms of kill probability is therefore determined by the maximum angular velocity and acceleration performance of which the weapon turret is capable, in addition to control accuracy within the performance limits. Improved performance for a given turret inertia necessitates an increase in turret drive power. Torque and speed characteristics of the drive motor and the associated gear train must be carefully selected for an optimum trade-off between turret maximum speed and acceleration to provide maximum effectiveness for the power available. Mathematical or computer studies are most helpful in establishing power, acceleration, and velocity requirements for a "spectrum" of target trajectory conditions. In the past, systems having high turret-drive power combined with accuracy and rapid response to control signals in mobile armored vehicles have not been achieved. In the present invention, however, means have been found to provide these highly desirable features.

In naval shipboard fire-control systems, much space is available below deck for installation of massive prime movers and control equipment to provide high-power turret operation. However, in battle tanks and other armored vehicles, such space is not available. It is therefore imperative that every possible reduction in size and weight of power generating and control equipment be effected. This has been accomplished as follows. More power per unit weight or volume is generally available from high-speed machines than from low-speed machines. For example, high-speed gas turbines are much smaller than equally powerful low-speed piston engines. High-speed electric motors and generators are smaller than equally powerful low-speed machines. For compactness, this idea is fully exploited for the prime mover, the power generator, and the D.C. rotary amplifier in the present instance. To further provide high power in a limited space, a small motor and flywheel combination is utilized in place of a massive electric motor to drive the rotary amplifier. This technique not only tends to reduce weight and bulk but also allows for matching the peak available flywheel power to the peak turret demand in duration and magnitude. Furthermore, the rotating flywheel permits a large energy reserve to be available at the turbo-generator for use by ancillary electronic equipment in the vehicle. Power surges at the generator are minimized, due to energy being supplied from the flywheel to drive the turret. In the absence of such an energy reserve, the massive electric motor required would impose large momentary power drains on the turbo generator during peak turret demands, resulting in overloading and degradation of voltage regulation of power supplied to the ancillary equipment. This system therefore provides the high power necessary for improved weapon performance while simultaneously providing the large source of ancillary power needed for weapon sub-systems. In one embodiment, for example, twenty kilowatts of regulated power is generated by the prime mover and ten kilowatts of this power is available for ancillary equipment.

The invention as described may be incorporated in automatic servo control systems. For example, as part of a fire control system, computers or operators would provide command signals derived from tracking of aerial targets to cause turret rotation and positioning. In this case, sensors would be installed in the turret to provide feedback of the actual position and velocity values permitting error signals to be generated for servo control.

The above-mentioned objects and advantages of the present invention will be more clearly understood when considered in conjunction with the accompanying drawings, in which:

DETAILED DESCRIPTION OF THE INVENTION

Although the present invention will be discussed in terms of a typical track, military vehicle, it is to be understood that the drive system is equally applicable to other types of vehicles, such as construction equipment incorporating turrets.

Figure 1:
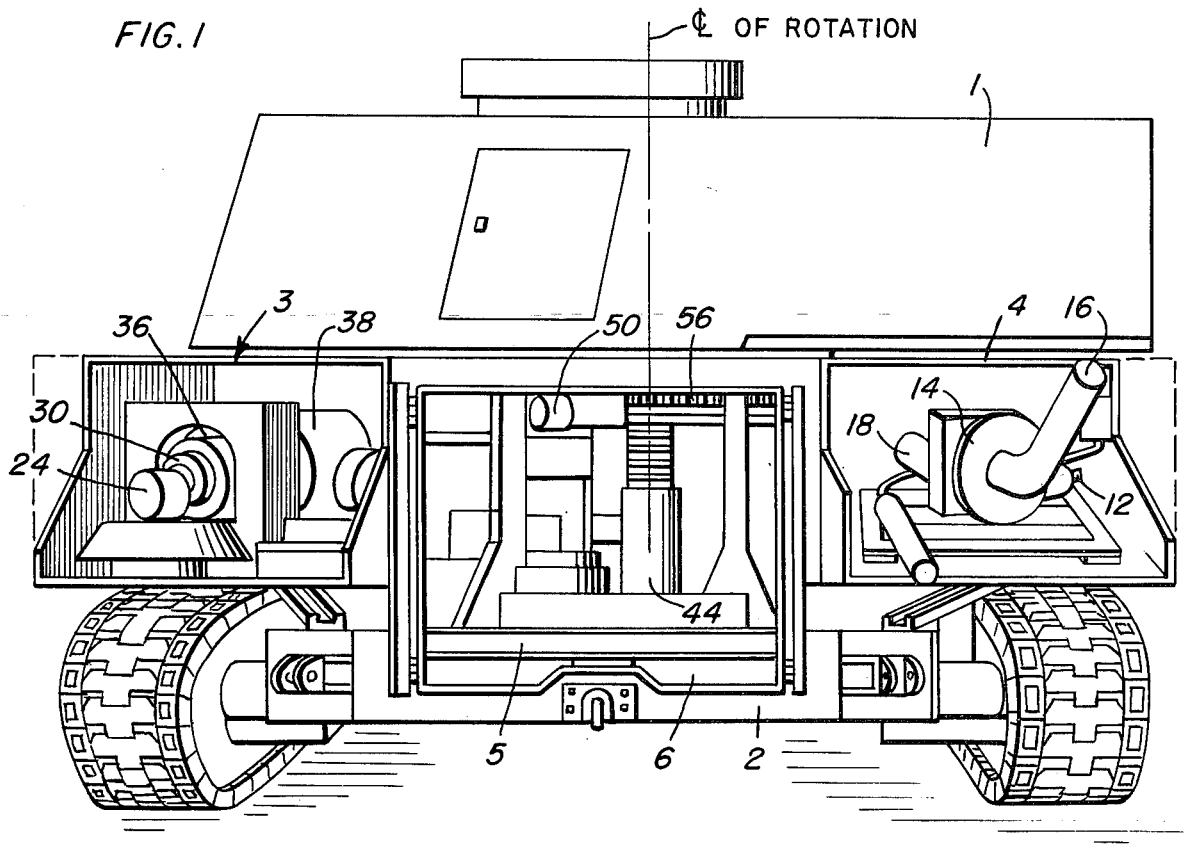
FIG. 1 is a perspective view illustrating a track military vehicle incorporating a turret.

Referring to FIG. 1, a typical military track-laying vehicle is illustrated as including a turret 1 mounted above the central body or hull 2. A rotating platform 5 is connected with the turret 1, both rotating relative to the floor 6 of the hull 2.

A first compartment, generally indicated by 3, is provided on the rearward left side of the hull, as pictured in FIG. 1. A second compartment is also provided, as in the case of a symmetrically positioned compartment 4 shown in the figure. The compartments are used to house electromechanical machinery, as will be explained hereinafter.

Figure 2:
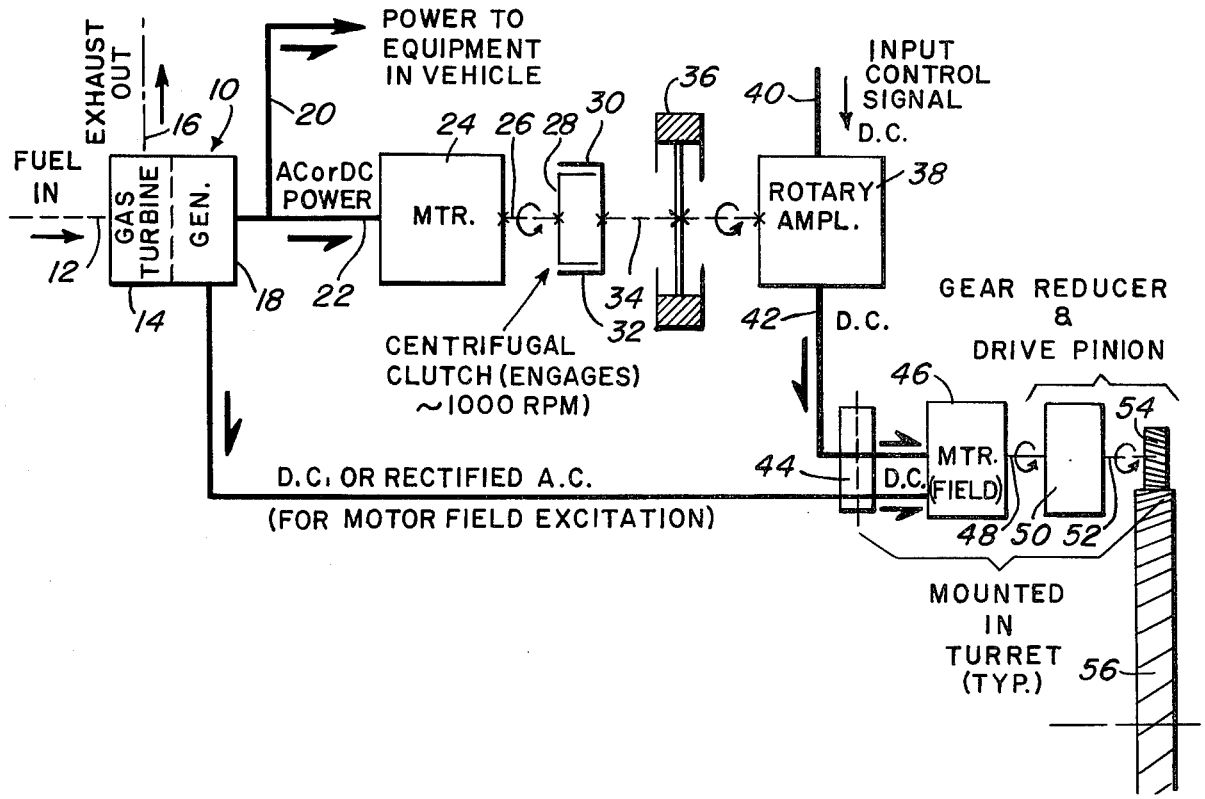
FIG. 2 is a block diagram of the turbo-electric turret drive system used in conjunction with a vehicle such as that shown in FIG. 1.

Reference is now also made to FIG. 2 which illustrates, in block diagram form, the turbo-electric turret drive system of the present invention.

A turbo-generator 10 is mounted in the hull compartment 4 (FIG. 1). The turbo-generator includes a conventional gas turbine 14 that consumes jet-power or diesel-fuel oil, introduced at 12. Shaft power is delivered to drive a conventional high-speed electric generator, typically rated at 20KW output, continuous duty. As fuel is consumed, the exhaust is properly vented as indicated by 16. A first path 20 for the electric power is to other equipment in the vehicle at a typical rating of 10KW. In one embodiment, an A.C. power frequency of 400±8Hz is produced at a voltage of 208v±2.5%.

A second path for the electric power derived from generator 18 is denoted by 22. The power along path 22 is applied to a high-speed electric motor 24, which may typically be a 11000/3200 RPM gearmotor operating at a frequency of 400Hz and at a rating of 3½Hp, continuous duty. Such motors are conventional. The driveshaft 26 of the motor is coupled to a first component 28 of the conventional centrifugal clutch 30 which engages, typically at 1,000 rpm. The clutch is used to decrease the load on the high-speed motor during starting, thereby reducing the current drain on the turbo-generator and enabling the turbo-generator to maintain a high degree of voltage regulation at all times. A second component 32 of the clutch 30 is coupled to the input driveshaft 34 of a conventional high speed rotary amplifier 38. Appropriately positioned on the driveshaft is a kinetic storage flywheel 36. Typically, the flywheel may weight as much as 85 pounds and the energy stored at 3,200 RPM is typically 57,000 ft. lb. The motor 24 serves as the driver for the rotary amplifier. The flywheel mounted to the input driveshaft of the rotary amplifier stores kinetic energy due to the rotation of the flywheel at operating speed.

The rotary amplifier may typically be rated at 7.3KW. continuous duty, and may typically operate at 3,200 RPM with a 37KW peak momentary output. When a suitable D.C. electric control voltage is applied at 40, to the amplifier control winding (not shown), the amplifier 38 will generate D.C. electric power corresponding to the magnitude and polarity of the input control signal.

Referring to FIG. 1, the motor 24, clutch 30, flywheel 36, and rotary amplifier 38, are shown to be mounted at 3. The turbo-generator 10, previously discussed is likewise enclosed in a compartment, as indicated by 4 in FIG. 1.

Referring to FIG. 2, the output from the amplifier 38 will provide DC power along output line 42 to a hull-to-turret rotary slip ring assembly 44 that serves to transmit power from the hull to the turret. In FIG. 1, the slip ring assembly 44 is illustrated as typically located. The heavy duty slip ring assembly is of a conventional type. The power transmitted by the slip ring assembly 44 depends upon the output from amplifier 38, which in turn depends upon the control voltage applied at 40.

A conventional DC motor 46 is secured to the turret, for rotation therewith. The output from the slip ring assembly feeds the motor 46, the latter typically rated at 6¾Hp continuous duty, with a 42Hp peak momentary rating. The driveshaft from motor 46 is coupled to the input driveshaft of a gear box 50 which achieves gear reduction. Anti-backlash gearing is typically employed to provide stability to an associated servo control system. Gear reduction assemblies are old in the art and detailed description thereof is unnecessary. The output shaft 52 from the gear reducer 50 drives a pinion gear 54 that is also mounted in the turret, for rotation therewith, as is the case with motor 46 and gear reducer 50. The position of the gear reducer 50 may be seen in FIG. 1, in meshing relationship with a stationary bull gear 56, that is circular in shape and affixed to the hull. Thus, whenever the DC motor 46 is energized, there is a resulting acceleration and rotation of the turret 1 (FIG. 1).

Whenever the control signal voltage at 40 in FIG. 2 is such that the turret is stationary or is coasting at constant speed, little or no electric power is delivered from the rotary amplfier 38. Under these circumstances, the flywheel 36 is not called upon to supply energy, and will continue to rotate without slowing down. However, if a control signal is impressed at 40, upon the rotary amplifier control winding, a change will take place. The control signal would correspond, by way of example, to lead-angle tracking of the pass course of a high speed aircraft target. After impressing a control signal upon the control winding, the power from the rotary amplifier 38 causes turret rotational acceleration. Nearly 40Hp may momentarily be developed in a vehicle as described in this typical embodiment. To prevent overloading the generator 18 and causing a voltage drop in the power lines 22, 20, the flywheel "smoothes" the output of the generator 18. Otherwise expressed, the flywheel gives up kinetic energy, loses some speed, and the high-speed motor 24 then returns the flywheel to its normal speed, when the peak power demand has been met and is over. Thus, the flywheel 36 serves to provide voltage regulation, supplying energy to the system during moments of peak demand. The kinetic energy of the flywheel 36 is increased to its normal value when the system is operating with no peak demands.

As an example of the characteristics of equipment installed in a vehicle as described herein, the high-speed motor 24 weighs only 18 pounds and is capable of delivering 24Hp during starting of the motor-rotary amplifier (46, 38). In performance tests of this turret system, a severe pass course results in a 20 percent reduction in flywheel-rotary amplifier speed and the motor 24 produces about 4-6Hp. during the short flywheel recovery period (less than 5 seconds).

Thus, in summary, it will be seen that a typical embodiment of the present invention when utilized in the environment of a heavy-duty turret vehicle, can supply up to 40Hp output momentarily from a D.C. motor via an A.C. motor-flywheel, of which the A.C. motor typically operates between 1 and 6Hp output, and the amplifier control signal is approximately 30 milliamps (at 15 volts) maximum.

As will now be appreciated, a unique feature of this system includes the ability to supply high peak power and precise control of turrets in mobile and armored vehicle applications.

A further feature is the ability to drive a massive turret at angular rates and accelerations up to 10 times as large as those of other known mobile, track vehicles, of the type described.

Still further, there has been accomplished the design to utilize turbo-generator output to drive a turret when used in conjunction with a rotary amplifier and flywheel combination. However, simultaneously, the generator output is used to supply approximately 10KW to other equipment in the vehicle, such power being adequately regulated.

Still further, the design offers maximum power and delivery of maximum tracking and lead-angle capability in a minimum space.

The present system is self contained in a vehicle and is not required to be connected to external power supplies during operation which permits the system to be utilized in fire-on-the-move, fire-control systems.

The centrifugal clutch 30 is utilized during starting and permits the starting of the rotary amplifier 38 while on the move. That is to say, that no external power assistance is required for starting of either the turbo-generator or the rotary amplifier, both of which can be started on the move.

In the preferred embodiment, shown in the block diagram of FIG. 2, typical electrical and mechanical machines and components are identified as follows:

Gas Turbine 14
AiResearch Manufacturing Company
Phoenix, Arizona
Model No. GTP-30 (50,000 RPM Rotor, 8000 RPM Output)

Generator 18
General Electric (8000 RPM)
400 Hz, 20kw, 120/208 V, 3 phase

Rotary-Amplifier Motor 24
400 Hertz AC, (3200 RPM)
Hoover Electric Company
Los Angeles, California
Model No. 1260

Centrifugal Clutch 30
Eaton Corporation
Kenosha, Wisconsin
Model No. C55L3 (with SDS bushings)

Rotary Amplifier (Amplidyne) 38
General Electric Company
Erie, Pennsylvania
Model No. AM617
23.5 amps, 250 volts DC, 3450 rpm
overload factor 6x High-current Slip Ring 44
Electro Tech Company
Blacksburg, Virginia Drive Motor 46
General Electric Company
6¾Hp, 20 amp, shunt compensating, DC
K4062401 — frame size CD 288
overload factor 6x Turret Drive Gearing
M109 Vehicle Type Gearbox
Modified for
1. electric drive and
2. reduced gear ratio We wish it to be understood that we do not desire to be limited to the exact details of construction shown and described, for obvious modifications can be made by a person skilled in the art.

Wherefore, the following is claimed:

1. A turret-drive system for mobile vehicles comprising:
   a rotary amplifier having a substantial overload factor;
   a first electric motor connected to the driveshaft of a rotary amplifier for driving the rotary amplifier;
   a flywheel mounted to the driveshaft for storing kinetic energy during normal rotation of the shaft;
   means for impressing a control signal at the input of the rotary amplifier thus generating a related DC output;
   a second electric motor having a substantial overload factor connected to the DC output for driving first gear means at a rate determined by the control signal, said first gear means being connected to a rotatable turret of a mobile vehicle;
   second gear means relatively stationarily positioned for meshing engagement with said first gear means;
   a turbo-generator having the generator output thereof connected to the first electric motor thereby energizing the latter;
   said flywheel having a size such that rotation of the rotary-amplifier driveshaft remains fairly constant during momentary peak demands on the rotary amplifier, due to relatively limited energy transfer from the flywheel, the peak damands being met by operation of the rotary amplifier and second electric motor in their overload range;
   whereby the turret-drive system is capable of driving a turret to track high-speed aerial targets while having a size and weight suitable for use in mobile land vehicles.

2. The subject matter of claim 1 together with slip ring means for transmitting power from the rotary amplifier to the second motor, the latter being mounted to the turret and rotatable therewith.

3. The subject matter of claim 2 together with means for also connecting the output of the generator to auxiliary electric equipment in the vehicle.

4. The subject matter of claim 3 together with a centrifugal clutch coupled between the first motor and the rotary amplifier driveshaft to cause linked rotation therebetween when the driveshaft exceeds a predetermined minimum speed.

5. The subject matter of claim 4 wherein the first gear means includes a gear reducer and a drive pinion connected to the output of the reducer.

6. The structure of claim 5 wherein the second gear means is a bull gear mounted to the hull of the vehicle.

7. The subject matter of claim 6 wherein the turbogenerator includes a gas turbine having its driveshaft connected to the driveshaft of a generator.

8. The structure of claim 7 wherein the control signal is impressed across the control windings of the rotary amplifier.

9. The structure of claim 1 wherein the first electric motor, the rotary amplifier, the flywheel, and the turbogenerator all operate at high rotational speed to provide maximum power per unit of sapce and weight.

10. The subject matter of claim 1, excepting that the second electric motor and the first gear means are stationarily positioned and the second gear means is a bull gear mounted to rotate with the turret, thereby eliminating the necessity for a slip ring.

11. The subject matter of claim 5, excepting that the second electric motor and the first gear means are stationarily positioned and the second gear means is a bull gear mounted to rotate with the turret, thereby eliminating the necessity for a slip ring.

12. The subject matter of claim 6, excepting that the second electric motor and the first gear means are stationarily positioned and the second gear means is a bull gear mounted to rotate with the turret, thereby eliminating the necessity for a slip ring.

13. The subject matter of claim 1 wherein the overload factor of said rotary amplifier and of said second electric motor is approximately six.

* * * * *